United States Patent [19]

Labrum

[11] Patent Number: 4,696,061
[45] Date of Patent: Sep. 22, 1987

[54] ACOUSTO-OPTIC R-F RECEIVER WHICH IS TUNABLE AND HAS ADJUSTABLE BANDWIDTH

[75] Inventor: Joseph H. Labrum, West Jordan, Utah

[73] Assignee: Sperry Corporation, Blue Bell, Pa.

[21] Appl. No.: 910,793

[22] Filed: Sep. 22, 1986

Related U.S. Application Data

[63] Continuation of Ser. No. 566,437, Dec. 28, 1983, abandoned.

[51] Int. Cl.$^4$ .............. H04B 9/00; G02F 1/11
[52] U.S. Cl. .................. 455/609; 329/144; 350/358; 364/822
[58] Field of Search .............. 350/358, 162.12, 162.13, 350/162.14, 162.15, 162.19; 356/349, 350, 359, 361; 455/609, 619; 364/821, 822, 825, 826, 827; 329/144

[56] References Cited

U.S. PATENT DOCUMENTS

| | | | |
|---|---|---|---|
| 3,827,000 | 7/1974 | Matsushita et al. | 332/7.51 |
| 3,920,983 | 11/1975 | Schlafer et al. | 250/199 |
| 3,962,657 | 6/1976 | Redman et al. | 332/7.51 |
| 3,975,628 | 8/1976 | Graves et al. | 250/199 |
| 4,033,882 | 7/1977 | Fletcher et al. | 250/199 |
| 4,063,084 | 12/1977 | Goodwin et al. | 250/199 |
| 4,120,569 | 10/1978 | Richards | 350/3.68 |
| 4,126,834 | 11/1978 | Coppock | 332/7.51 |
| 4,146,783 | 3/1979 | Desbois et al. | 250/199 |
| 4,156,135 | 5/1979 | Miller et al. | 250/199 |
| 4,206,347 | 6/1980 | Avicola et al. | 455/608 |
| 4,208,091 | 6/1980 | Cheo et al. | 350/96.13 |
| 4,210,803 | 7/1980 | Ih | 455/610 |
| 4,325,635 | 4/1982 | Sattler et al. | 356/361 |
| 4,332,441 | 6/1982 | Margolis | 350/358 |
| 4,448,494 | 5/1984 | Freyre | 350/96.13 |
| 4,561,728 | 12/1985 | Kenan et al. | 350/356 |
| 4,579,417 | 4/1986 | Ih | 350/96.11 |
| 4,908,121 | 9/1975 | Riseberg et al. | 250/199 |

FOREIGN PATENT DOCUMENTS 2115572 9/1983 United Kingdom ............... 350/358

OTHER PUBLICATIONS

Thompson, D. E., et al., "Sagnac Fiber-Ring Interferometer Gyro with Electronic Phase Sensing Using a (GaAl)As Laser", Appl. Phys. Lett., vol. 33, No. 11, 1 Dec. 78, pp. 940–941.

Primary Examiner—Joseph A. Orsino, Jr.
Attorney, Agent, or Firm—G. Donald Weber, Jr.; Glenn W. Bowen; Laurence J. Marhoefer

[57] ABSTRACT

There is disclosed an acousto-optic filtering apparatus which includes Bragg cells in the signal path and in the local oscillator reference path of the apparatus in order to permit relatively high frequency signals to be detected by a relatively low frequency detector mechanism.

11 Claims, 4 Drawing Figures

ACOUSTO-OPTIC R-F RECEIVER WHICH IS TUNABLE AND HAS ADJUSTABLE BANDWIDTH

This is a continuation of application Ser. No. 566,437, filed Dec. 28, 1983 now abandoned.

BACKGROUND

1. Field of the Invention

This invention is directed to acousto-optic filtering devices, in general, and to an improved acousto-optic device which permits relatively high frequency signals to be detected with presently available technology, in particular.

2. Prior Art

There are many known acousto-optic detectors available in the technology today. These detectors are used to detect electrical signals, to convert the signals to optical signals and to then reconvert the optical signals to electrical signals. These devices provide a detecting scheme without requiring a direct interfacing with the signal source or direct reading of the electrical signals.

In many cases, the existing acousto-optical detection apparatus includes a Bragg cell therein. The Bragg cell permits the detection apparatus to be controlled in several respects. For example, by controlling the operation of the Bragg cell, a carefully controlled diffraction grating effect can be obtained. This then permits the output signal to be controlled and/or defined in a fairly rigorous manner.

However, most of the prior art detectors of this nature use photo-detector cells and/or arrays in the conversion from optical to electrical signals. While this is not a disadvantage, per se, it is a limiting factor in that most photodetector cells or arrays are relatively slow operating devices. That is, most of the existing photodetector cells or arrays are fabricated of silicon based materials (in solid state applications) or photo-multiplier tubes. Typically, these types of detectors can operate only in the low hundreds of megahertz range. Conversely, in many of the applications for this type of signal detection, the signals provided are in the multi-gigahertz range. Because of the two to three orders of magnitude difference in signal frequency, the existing photodetectors are not satisfactory for use with high frequency acousto-optical detector systems. Consequently, the existing acousto-optical systems cannot be used in the high frequency ranges.

SUMMARY OF THE INVENTION

The present invention is an acousto-optical detection apparatus similar to that known in the art and includes a Bragg cell in the main optical path thereof. However, the invention apparatus also includes a reference loop which is, essentially, in parallel with the main optical path. The reference loop includes a Bragg cell which is constructed in a similar fashion to the Bragg cell in the main optical detection path. By operating on the actual signal, as passed through the main optical path, and on the reference signal in the reference loop by means of the separate Bragg cells, appropriate control of the output signal can be obtained similar to a conventional superheterodyne receiver. Moreover, current state of the art detector devices can be used to detect high frequency signals.

DESCRIPTION OF A PREFERRED EMBODIMENT

Figure 1:
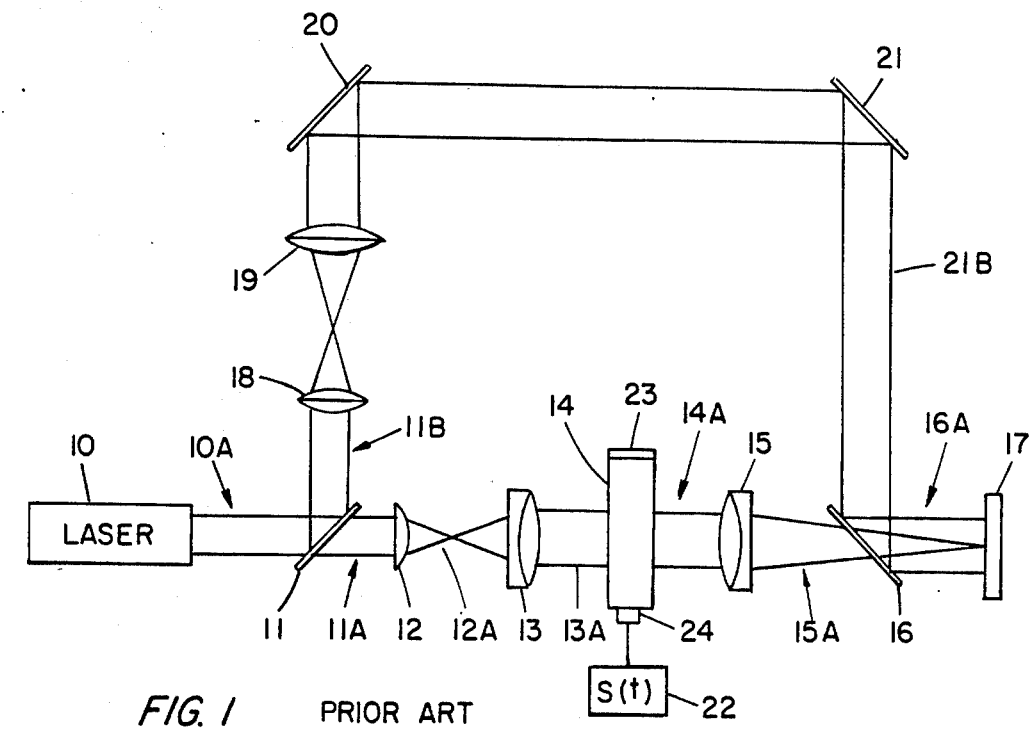
FIG. 1 is a schematic representation of the acousto-optical detector which is known in the prior art.

Referring now to FIG. 1, there is shown a schematic representation of an acousto-optical detector apparatus which is known in the prior art. In this arrangement, a laser 10 of suitable power and operating characteristics is provided. The laser provides a suitable beam of light 10A which is coherent and collimated, if necessary. Of course, any suitable source of sufficiently coherent light can be utilized. Typical types of lasers which can be utilized are HeNe, HeCd, NdYAG, Nd Glass, Ar or injection diode types. The laser 10 should have a wavelength or frequency which is compatible with the Bragg cell materials and the output detector, as described hereinafter.

The laser 10 produces a relatively small beam of light which is directed at a beam splitter 11 of suitable configuration and construction. Beam splitter 11 permits a portion of the original beam 10A to pass therethrough as beam 11A and reflects a separate portion 11B of the original beam. The passed beam 11A is substantially parallel to the incident light 10A and is supplied to an anamorphic beam expander which, typically, includes a cylindrical lens 12 and a spherical lens 13. The beam 12A is focused in the plane of the drawing by lens 12 and diverges to lens 13 where it is collimated into the wide, sheet beam of light 13A. The beam expander basically provides a relatively wide, sheet light beam which is then supplied to and projected through Bragg cell 14.

Bragg cells, more generically called acousto-optic cells, are well known in the art. These cells are comprised of some transmitting medium such as glass, oil, water, crystalline material or the like, disposed in a housing. To one end of the housing is attached an acoustic transducer 24. The other end of the housing may include an acoustic absorbing material 23. The most effective materials for use in this cell are those materials which are (1) optically transparent at the laser beam wavelength, (2) acoustically transparent at the transducer frequency, and (3) exhibit a significant change in the optical index of refraction when subjected to mechanical stress or deformation.

The physical characteristics of the Bragg cell 14, especially regarding light transmission, are altered due to mechanical deformation caused by the control signal S(t) which is applied thereto from a suitable source 22. In one embodiment, source 22 can be an antenna for receiving the signal S(t) from a suitable source. Of course, appropriate amplifiers can also be included. The electrical signal S(t) supplied to the Bragg cell is converted to acoustic waves disposed across the Bragg cell from transducer 24 to absorber 23. The acoustic waves are essentially parallel to each other and at the Bragg angle to the light beam path through the Bragg cell.

These wave fronts (which can be plane waves) change the transmission characteristics so that the Bragg cell becomes, in essence, a transmission diffraction grating. That is, the refractive index of the Bragg cell material is altered, e.g. increased slightly, at each compression and/or stress location along the longitudinal and/or shear wave. Thus, the incoming light beam has portions thereof slightly retarded by the cell in those portions of the cell having the slightly increased refractive index.

The Bragg cell is a transmitting diffraction grating because it transmits light therethrough. It is a phase diffraction grating because it alters the phase of the wavefront of the light transmitted therethrough. The period of the diffraction grating is inversely proportional to the frequency of the control signal, $S(t)$. That is, as the signal frequency increases, the periodicity of the cell decreases.

This diffraction grating operates like any other diffraction grating and causes energy in the incoming light beam to be diffracted in many directions. The undiffracted beam is referred to as the zero (0) order beam. Typically, the energy diffracted into the third, fourth, ... NTH orders is quite small and, often ignored. However, almost all of the energy can be caused to be diffracted into the first order ($+1$ or $-1$) by merely setting the Bragg cell at a prescribed angle (i.e., the Bragg angle) relative to the input light beam.

The diffracted beam can be controlled by changing the frequency of the control signal $S(t)$. That is, a change in the signal frequency changes the grating periodicity wherein the output (diffraction) angle is also changed. Thus, the first order output signal can be caused to scan over a particular angle. Phrased differently, the output beam produces a spot which moves on a focal plane in response to changes in the frequency of $S(t)$.

This output beam is also frequency shifted. That is, the input light beam has the frequency of the laser. However, when deflected, the frequency of the output light beam is equal to the frequency of the laser, plus the frequency of the signal $S(t)$, i.e., it is frequency shifted upwardly.

To this point, only the diffracting of the light beam into the $+1$ diffraction has been discussed. There is also a slightly different configuration which will diffract the energy into the $-1$ diffraction order. In this mode of operation, the frequency of the diffracted beam is down-shifted by an amount equal to the input signal $S(t)$. That is, the frequency of the output light beam is equal to the frequency of the laser, minus the frequency of the signal $S(t)$.

The discussion which follows refers to the $+1$, upward shifted, configuration but it is understood in the art that the same description would be equally correct when applied to the $-1$, downward shifted configuration.

The light beam 14A (whichever order) transmitted by Bragg cell 14, remains collimated and is applied to a Fourier transform lens 15. This lens is designed to produce the appropriate Fourier transform 15A of the signals which are supplied to Bragg cell 14. That is, the beam 14A which has passed through Bragg cell 14 has been diffracted with certain beam portions diffracted at different angles as a result of the alteration of the transmission characteristics of the cell in response to the input signal $S(t)$. The Fourier transform lens 15 has the capability of focusing the beam portion 14A from Bragg cell 14 into light beam 15A which is representative of the various frequencies in a nearly identically-true Fourier transform analysis. The focused beam 15A from lens 15 is passed through a beam combiner 16 as beam 16A. The beam 16A is focused by the transform lens 15 into a spot at the Fourier focal plane of the lens. In this embodiment, the focal plane is represented as a suitable detector array 17. As the frequency $S(t)$ changes, the spot moves along the plane. Thus, a type of frequency analyzer can be achieved.

Returning to beam splitter 11, the reflected beam portion 11B is passed through other optical apparatus including lenses 18 and 19 which expand and collimate this beam portion. The beam from lens 19 is supplied to and reflected by mirror 20 and mirror 21 thereby to return the beam 21B to the original path. In particular, mirror 21 reflects the beam to combiner 16 where the reflected beam 21B is combined with the beam 15A from Fourier transform lens 15. The beam which is passed via lenses 18, 19 and mirrors 20 and 21 is referred to as the local oscillator or reference beam, which has not been frequency shifted, and which is used as a reference against which beam 16A is heterodyned. However, there are no known detector arrays which can operate at frequencies above a few hundred MHz. Thus, the system is limited in the range of signals it can detect. Even though many detector schemes have been devised and tested, most of the known schemes are still too limited in operating frequency capabilities.

This apparatus and operation is known in the prior art. However, this apparatus and its attendant operation has various shortcoming. For example, the reference signal 21B (after reflection by combiner 16) must illuminate the entire area of the photo detector 17 because the input signal $S(t)$ may appear any place on the detector 17 and the reference beam is required for heterodyning. Moreover, the energy density (intensity) of this reference beam should be similar to that provided by the signal beam for optimum signal detection. However, in practice, the signal beam 16A from lens 15 falls on only a small portion of the detector 17 at any instant in time. This fact requires that the reference beam 21B (i.e., the L.O.) which must illuminate up to 1000 times the area of the signal beam, must contain up to 1000 times the power of the signal beam. Hence, a high power laser is required. The high power laser requires a larger physical space and prime input power, both of which are inefficient and disadvantageous in a practical system.

Also, the wavefront of reference beam 21B must align perfectly flat and parallel to the photodetector 17 over the entire surface of the detector. That is, the wavefronts of beams 21B and 16A must be parallel to each other at detector 17 for efficient heterodyning to take place. These requirements place very stringent demands on all of the optical elements in the system in order for this architecture to operate properly. Thus, a better system is highly desirable in order to overcome these problems and to provide a more practical and workable apparatus.

Figure 2:
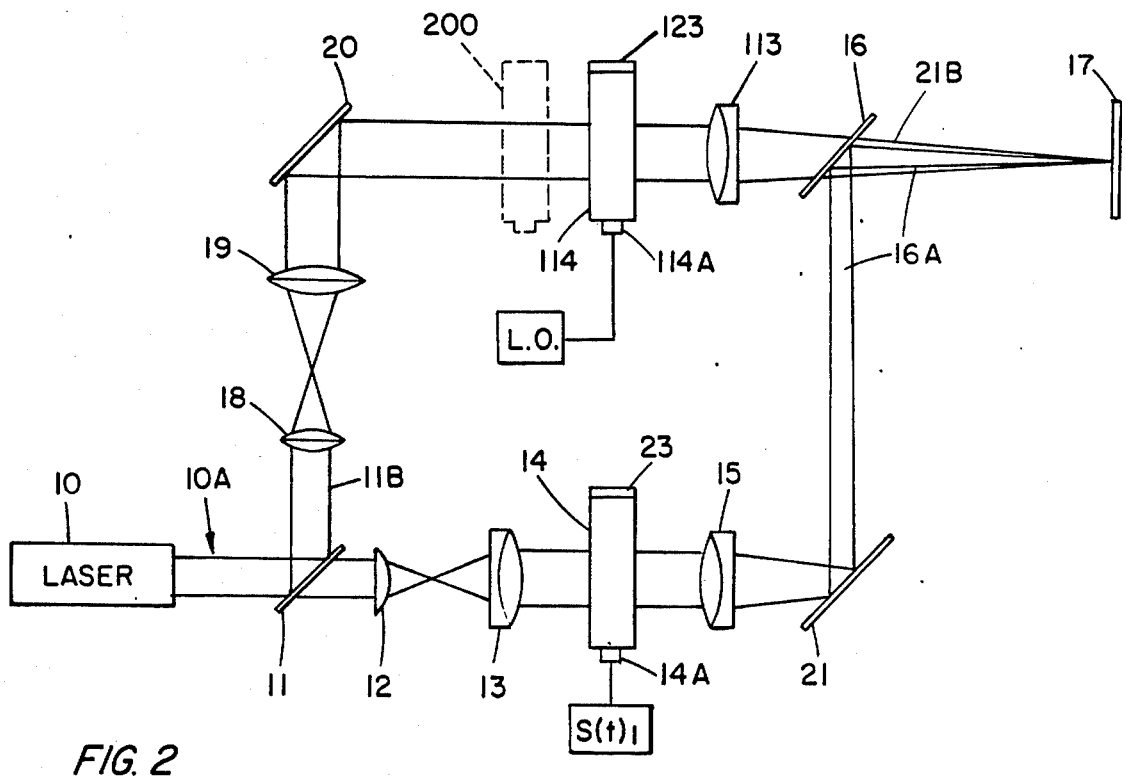
FIG. 2 is a schematic representation of the acousto-optical detector in accordance with the present invention.

Referring now to FIG. 2, there is shown a schematic diagram of the improved detector apparatus of the present invention. This embodiment operates as an adjustable bandwith, tunable, acousto-optic filter.

In FIG. 2, components which are similar to those shown in FIG. 1 bear similar reference numerals. These elements also operate in similar fashion. In essence, the embodiment of FIG. 2 consists of a Mach-Zehnder interferometer with a Bragg cell in each arm. The detector 17 can take several forms, such as, but not limited to, large area photo-multiplier tubes, avalanche photo-diodes, or PIN diodes.

As in the case shown and described relative to FIG. 1, laser 10 produces a beam 10A which is split by beam splitter 11. The beam 11A is operated upon by lenses 12, 13 and Bragg cell 14 as noted above. The output from Bragg cell 14 is again operated upon by the Fourier transform lens 15 to produce the Fourier-transform-representative beam 15A.

However, as shown in FIG. 2, the beam 15A is reflected by mirror 21 onto beam combiner 16 in FIG. 2 and then reflected to the detector 17. (Of course, mirror 21 and beam combiner 16 in FIG. 2 are substantially identical in form and function to mirror 21 and beam combiner 16 in FIG. 1.)

In FIG. 2, it is seen that the reflected or reference path includes appropriate optics to produce the anamorphic beam expander similar to that shown in FIG. 1. That is, the lenses 18 and 19 expand and collimate the reflected beam 11B which is received from beam splitter 11. The beam which is expanded and collimated to the extent desired, is applied to Bragg cell 114. Bragg cell 114 is of substantially the same characteristics and construction as Bragg cell 14. The sheet beam from Bragg cell 114 is then passed through Fourier transform lens 113 which causes the beam to be focused on photodetector 17 in the same fashion as Bragg cell 14 relative to beam 15A. In addition, beam 21B is combined with beam 16A by means of beam combiner 16. These combined beams are then focused on detector 17.

In similar fashion to cell 14, cell 114 includes an acoustical transducer 114A which is connected to receive a signal, L.O., from a local oscillator or signal generator and an acoustical absorber 123. In the preferred embodiment, the signal L.O. is lower in frequency than is the signal S(t). The output frequency at the photo-detector 17 is the result of heterodyning or beating between the two optical beams 21B and 16A. This output frequency is known as the intermediate output frequency (IF) and is equal to the difference in frequency between the two beams. The photo-detector 17 must be selected to be compatible with this IF frequency. For example, if the frequency difference between the two beams, and, hence, the L.O. and S(t) signals, is 30 MHz, then the output IF will be 30 MHz and the photo-detector 17 must be able to respond to this 30 MHz signal.

The beam which is transmitted through Bragg cell 114 and lens 113 is then passed through beam combiner 16 as before. From combiner 16, the beam is applied to the detector 17. The operation of the detector 17 will be quite similar as in the instance of the prior art. However, the control mechanism which is permitted relative to the signals supplied to the detector is much improved.

Also shown in FIG. 2, in dashed outline, is an optional aperture 200. The aperture is shown in the reference path. In point of fact, it can be disposed at any location in the reference path, after the beam splitter 11 and anamorphic beam expander (lenses 18 and 19), but before the Fourier transform lens 113. In effect, the aperture 200 (or iris) is provided to control the diameter of the reference beam spot which is supplied to the detector 17.

Figure 3:
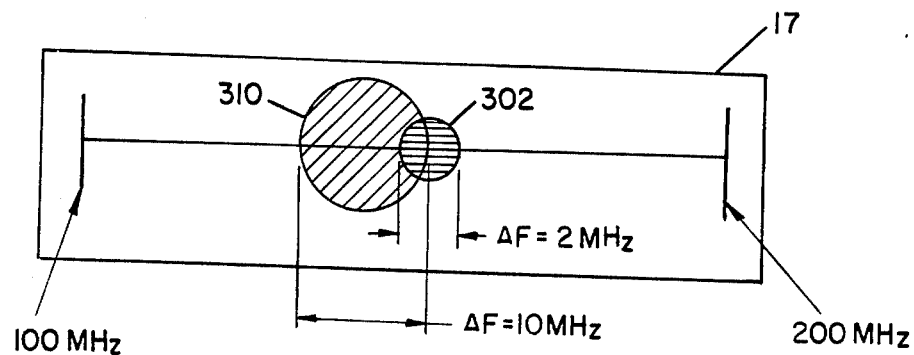
FIG. 3 is a schematic representation of the output optical signals produced at the Fourier transform plane in the instant invention.

The relationship of the output light beams is shown in FIG. 3. At the photo-detector 17, the spot 310 formed by the local oscillator (L.O.) and the spot 302 formed by the signal S(t) will overlap and the difference frequency of 30 MHz becomes the frequency IF. The size of the L.O. spot 310 determines the bandwidth of the system. If, in the Fourier transform plane, the L.O. spot 310 occupies an area corresponding to about 10 MHz (see FIG. 3), then any spot 302 generated by the input signal S(t) in the Fourier transform plane and overlapping the L.O. spot will generate an output signal centered around the frequency of the IF signal.

If the spot size in the Fourier transform plane coming from the L.O. path is diffraction limited, its size can be controlled by adjusting the width of the laser beam passing through the Bragg cell 114. To do this, the iris diaphragm 200 may be used (see FIG. 2). If the L.O. Bragg cell 114 has a maximum aperture time (acoustic transit time) of 10 microseconds, then with the iris fully open the L.O. spot size 310 will correspond to 100 KHz. If the iris is stopped down to a size corresponding to an aperture time (Bragg cell) of 0.1 microsecond, the spot in the Fourier transform plane will correspond to 10 MHz. Thus, the output IF bandwidth can be adjusted from 10 KHz to 10 MHz. In fact, an aperture is merely optional and need not be utilized. In some cases, the beam diameter is controlled directly by the laser or other optical devices.

In essence, the operation of the basic apparatus of the instant invention (i.e., the main beam path) is similar to the prior art. However, the addition of Bragg cell 114 and the acoustic reaction thereof to form a diffraction grating is important. Briefly, the signals produced by the main beam 11A and the reference beam 11B are, ultimately, combined at the output detector 17. The output signal is basically comprised of four components. These components are:

1. The local oscillator frequency (L.O.F.) which is (L+S(L.O.)) where L=Laser frequency and S(L.O.)=local oscillator frequency signal;
2. The laser frequency plus the input signal (L+S(t));
3. The sum of (1). and )2). viz. (L+S(L.O.)+L+S(t)); and
4. The difference between (1). and (2). viz. (L+S(L.O.)−(L+S(t)).

The signals 1,2 and 3 are much too high in frequency (on the order of $10^{15}$ Hz) for the detector 17 to observe and operate on properly. However, the detector can operate and react to signal no. 4, i.e. the difference between the two input signals which is typically in the low megahertz range. For example, if the input signal S(t) is selected to be 120 MHz and the local oscillator signal S(L.O.) is selected to be 90 MHz, the difference is 30 MHz which is well within the operating characteristics of most photo-multiplier tubes or detectors known in the art. In addition, the 30 MHz signal is the IF output signal which is then compatible with the subsequent utilization circuitry (not shown). In fact, the subsequent circuitry IF characteristic is advisedly considered in selecting the input signals S(t) and S(L.O.).

Figure 4:
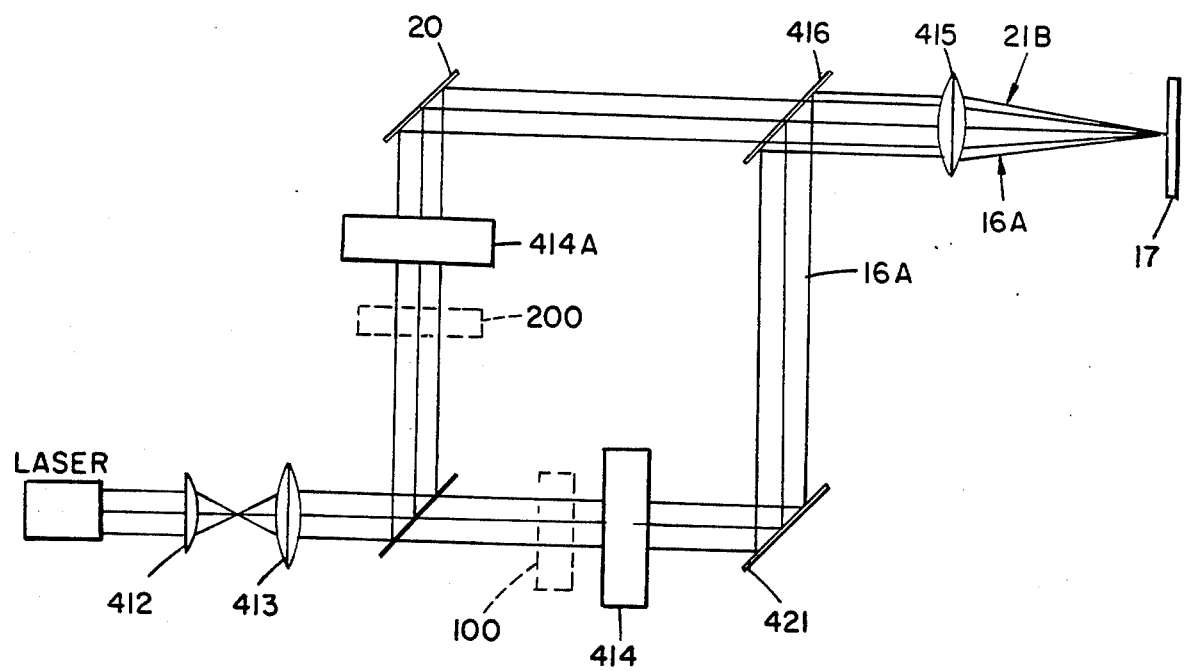
FIG. 4 is a schematic representation of another embodiment of the instant invention.

FIG. 4 is another embodiment of the invention. The numbering and function are the same as described above. The primary difference is that the input and output optics are used in common relative to both the signal and reference arms of the device. This permits a reduced cost of fabrication and avoids the potential problem of matching component characteristics in the different paths.

The embodiment of FIG. 4 also suggests that an aperture 100 can be used in lieu of aperture 200 in the respective signal paths. Moreover, a common beam expander (lenses 412 and 413) can be used as well as a common Fourier transform lens 415 with satisfactory operating results.

In comparing the prior art to the inventive concept, it should be noted that in both cases the local oscillator or reference channel places a light beam and/or spot at the focal plane of the Fourier transform lens(es). This permits heterodyning which permits the output signal IF(t) to be obtained. However, in the prior art the local oscillator beam is, effectively fixed and illuminates the entire Fourier transform plane. That is, it cannot be changed in time or space. However, by inserting the Bragg cell 114 in the local oscillator or reference beam path, and applying a local oscillator signal thereto, the reference beam can be deflected and operated upon in the same fashion as the beam passing through Bragg cell 14. This permits the local oscillator spot to be moved appropriately and to be selectively heterodyned with any input signal S(t).

More particularly, the application of the local oscillator signal L.O. to Bragg cell 114 permits this cell to frequency shift the reference beam, to thereby permit heterodyning between the signals from Bragg cell 114 and Bragg cell 14. In practice, the local oscillator signal should be different from the input signal S(t) in order to obtain a useful output. For example, if S(t) is 120 MHz and the local oscillator signal S(L.O.) is 90 MHz, the heterodyned difference therebetween will be 30 MHz which will be the frequency of the signal supplied to the output detector.

It is well known in the art that photodetectors with 30 MHz operating capabilities are readily available. The 90 MHz or 120 MHz or greater MHz signals cannot be readily detected by current, commercially available photodetector arrays.

In order to effect the heterodyning noted above, it should be understood that light beams from Bragg cells 14 and 114 can be diffracted at any angle. These angles can be the same or different in the respective beam paths. However, mirror 21 can be used to redirect the beams so as to make these beams parallel and coaxial. That is, even though the beams have different frequencies they can be forced, by optical means, to be coaxial. When the beams are coaxial, they will be parallel and will focus at the same spot on the Fourier transform plane. In particular, the two beams will focus at the Fourier transform focal plane with one spot on top of the other. This will permit the heterodyning wherein the photodetector will see the difference between the local oscillator frequency S(L.O.) and the input signal frequency S(t). In the example given above, the photodetector will see the signal of 30 MHz whether it is a carrier wave or modulated. This signal is then used as the IF input signal to the circuitry which is connected to the detector circuit.

Thus, there is shown and described a unique detector which reduces the power requirements of the input or laser device because all of the local oscillator power is placed within a single spot. Moreover, this device mixes down the input signal S(t) to an output IF frequency wherein currently available technology can be used to detect the signal. The device and apparatus can be used to control the output signal bandwidth and be tuned to any signal S(t) within the bandwidth of the Bragg cell.

While a preferred embodiment is described, it is clear that modifications can be made to the system. For example, the Bragg cells are preferably of the same material. However, Bragg cells of different materials can be used to provide an operating device but other controls, both optical and electrical, may be required in order to make the signals compatible. Nevertheless, any such modifications which fall within the purview of this description are intended to be included therein as well. It should be understood that the description of the invention herein is intended to be illustrative only and is not intended to be limitative. Rather, the scope of the invention is limited only by the claims appended hereto.

Having thus described a preferred embodiment, what is claimed is:

1. An acousto-optic filter comprising,
   light source means for providing a main coherent light beam,
   beam splitter means for receiving and splitting said main light beam into first and second coherent light beams,
   local oscillator means for supplying a fixed frequency first signal,
   signal source means for supplying a second signal,
   first and second acousto-optic cells driven by said first and second signals, respectively, each disposed to respectively receive one of said first and second coherent light beams at an acousto-optical angle, for diffracting and modulating said first and second light coherent beams in response to said first and second signals, respectively, in order to form first and second diffracted and modulated light beams,
   optical superimposing and Fourier transform lens means for providing and projecting a heterodyned light beam derived from said first and second diffracted and modulated light beams,
   and detection means having a detecting surface wherein said detection means is constructed for detecting said Fourier transformed heterodyned beam of light and for providing an electrical signal of an intermediate frequency derived from said first and second signals, said detecting surface being positioned at the Fourier focal plane of said Fourier transform lens means to intercept said heterodyned light beam so that an area of light is illuminated on said detecting surface at an instant of time which is representative of said heterodyned light beam such that the size and location of any such area on said detecting surface is respectively a function of said intermediate frequency and said first signal at said instant of time.

2. An acousto-optic filter as claimed in claim 1 wherein said Fourier transform lens means comprises two separate Fourier transform lenses each positioned to receive one of said first and second diffracted and modulated light beams before said first and second diffracted and modulated beams are superimposed.

3. An acousto-optic filter as claimed in claim 1 comprises a single Fourier transform lens positioned to receive said heterodyned beam of light after said first and second diffracted and modulated beams are superimposed.

4. An acousto-optic filter as claimed in claim 1 comprises first and second anomorphic beam expanders disposed after said beam splitter means but before said first and second acousto-optic cells, respectively thereby to individually expand and collimate each of said first and second coherent light beams.

5. An acousto-optic filter as claimed in claim 1 comprising, reflector means disposed relative to one of said first and second acousto-optic cells in order to permit said first and second acousto-optic cells to be arranged so that said first and second coherent light beams pass into said first and second acousto-optical cells along substantially parallel paths.

6. An acousto-optic filter as claimed in claim 1 wherein, each of said acousto-optical cells comprises a Bragg cell.

7. An acousto-optic filter as claimed in claim 6 comprises first and second anamorphic beam expanders disposed after said beam splitter means but before said first and second acousto-optic cells, respectively thereby to individually expand and collimate each of said first and second coherent light beams.

8. An acousto-optic filter as claimed in claim 7 comprising, reflector means disposed relative to one of said first and second acousto-optical cells in order to permit said first and second acousto-optic cells to be arranged so that said first and second coherent light beams pass into said first and second acousto-optical cells along substantially parallel paths.

9. An acousto-optic filter as claimed in claim 8 comprising iris means disposed to control the width of one or more of said coherent light beams.

10. An acousto-optic filter as claimed in claim 9 wherein said Fourier transform lens means comprises separate Fourier transform lenses positioned to receive each of said first and second diffracted and modulated light beams before said first and second diffracted and modulated beams are superimposed.

11. An acousto-optic filter as claimed in claim 9 comprises a single Fourier transform lens positioned to receive said heterodyned beam of light after said first and second diffracted and modulated beams are superimposed.

* * * * *